United States Patent [19]

Miyoshi et al.

[11] Patent Number: 4,584,883

[45] Date of Patent: Apr. 29, 1986

[54] KARMAN VORTEX FLOWMETER

[75] Inventors: Noriomi Miyoshi, Kawasaki; Michihiko Tsuruoka, Sagamihara; Mutsumi Nagumo, Musashino, all of Japan

[73] Assignee: Fuji Electric Company, Ltd., Japan

[21] Appl. No.: 439,900

[22] Filed: Nov. 8, 1982

[30] Foreign Application Priority Data

| Nov. 10, 1981 | [JP] | Japan | 56-179071 |
| Nov. 10, 1981 | [JP] | Japan | 56-179072 |
| Apr. 22, 1982 | [JP] | Japan | 57-66330 |
| Jun. 15, 1982 | [JP] | Japan | 57-102673 |
| Jun. 15, 1982 | [JP] | Japan | 57-102674 |
| Jun. 15, 1982 | [JP] | Japan | 57-102675 |
| Jun. 15, 1982 | [JP] | Japan | 57-102676 |
| Jun. 15, 1982 | [JP] | Japan | 57-89364 |
| Jun. 15, 1982 | [JP] | Japan | 57-102677 |

[51] Int. Cl.$^4$ ............................................. G01F 1/32
[52] U.S. Cl. ............................................. 73/861.24
[58] Field of Search ........... 73/861.22, 861.24, 118 A, 73/653, 656, 861.21

[56] References Cited

U.S. PATENT DOCUMENTS

| 3,722,273 | 3/1973 | Yamasaki et al. | 73/861.22 |
| 3,796,095 | 3/1974 | Fussell, Jr. | 73/861.24 |
| 4,074,571 | 2/1978 | Burgess | 73/861.24 |
| 4,085,614 | 4/1978 | Curran et al. | 73/861.24 |
| 4,134,296 | 1/1979 | Kastner | 73/861.22 |
| 4,161,878 | 7/1979 | Fussell, Jr. | 73/861.24 |
| 4,181,020 | 1/1980 | Herzl | 73/861.24 |
| 4,380,935 | 4/1983 | Sgourakes et al. | 73/861.24 |

FOREIGN PATENT DOCUMENTS

| 48-30458 | 4/1973 | Japan . | |
| 50-36990 | 11/1975 | Japan . | |
| 53-111763 | 9/1978 | Japan . | |
| 53-110556 | 9/1978 | Japan . | |
| 54-8308 | 4/1979 | Japan . | |
| 54-9069 | 4/1979 | Japan . | |
| 54-37511 | 11/1979 | Japan . | |
| 55-60518 | 4/1980 | Japan . | |
| 55-36933 | 9/1980 | Japan . | |
| 56-39415 | 4/1981 | Japan . | |
| 823684 | 11/1959 | United Kingdom | 73/861.24 |

Primary Examiner—James L. Rowland
Assistant Examiner—Brian R. Tumm
Attorney, Agent, or Firm—Brumbaugh, Graves, Donohue & Raymond

[57] ABSTRACT

A Karman vortex flowmeter for deriving the velocity or quantity of fluid flow is comprised of an upstream pillar for producing Karman's vortex streets or paths that has a substantially isosceles triangle cross section, a downstream pillar for producing Karman's vortex paths that has a substantially isosceles trapezoidal cross section, a vibration chamber, and a vibrator member supported in the vibration chamber in a state of mass equilibrium relative to a revolving shaft passing through its center of gravity such that it can vibrate torsionally about the revolving shaft. The base of the upstream pillar is substantially equal to the base of the downstream pillar, and the pillars are positioned so that the bases are parallel to each other and perpendicular to the direction of the fluid flow. The vibrator member is preferably provided with a pair of taut bands supporting the vibrator member which form the revolving shaft and a frame which supports the bands. The taut bands may be pressed by a spring member to ensure uniform tension in the face of temperature changes, and may be damped with suitable elastic material. The flowmeter is provided with a photoelectric detector to detect the vibration of the vibrator member as it vibrates in response to pressure variations attributable to the Karman streets produced by the pillars. The detector preferably includes an integrator and comparator which cooperate to derive only effective frequency components.

14 Claims, 41 Drawing Figures

KARMAN VORTEX FLOWMETER

The present invention relates to a Karman vortex flowmeter for detecting the frequency of a vibrator member which is caused to vibrate by vibrational pressure variations occurring in the vicinities of the opposite sides of a pillared vortex generator placed vertically to the flow of a fluid. More particularly, the present invention relates to improvements in a vortex generator in such a Karman vortex flowmeter, improvements in detector means for detecting the vortices or vibrational pressure variations produced by the vortex generator of the Karman vortex flowmeter and improvements in circuits for processing the signal detected by the vortex detector means of the Karman vortex flowmeter. The invention also relates to improvements in means for accommodating Karman vortex flowmeters of this kind to measurement of the quantity of air inhaled by an internal combustion engine of an automobile or the like.

A Karman vortex flow meter to which the present invention pertains has been already proposed by the present applicant in Japanese Patent Application No. 90813/1981 and is shown in FIGS. 1 and 2. FIG. 1 is a front elevation of this known Karman vortex flowmeter, and FIG. 2 is a view illustrating the construction of the vortex detecting apparatus of the flowmeter.

Referring to FIG. 1, there is shown a pipe line 1, a vortex generator 2 for generating Karman's vortex paths or streets, openings 3 and 3', a vortex detector 4, and optical fiber 5, and a processing circuit 6 for processing the signal detected. The vortex detecting apparatus is comprised of the devices 4 through 6. As shown in FIG. 2, the vortex detector 4 is provided with a vibration chamber 43 having a substantially isosceles triangular cross section, and a vibrating plate 44, which is caused to vibrate by vortices occurring near the vortex generator 2, is installed within the vibration chamber 43. Pressures of Karman's vortices are introduced through openings 41 and 42. The signal processing circuit 6 consists of a light emitting device 6a, a light receiving device 6b and a waveform shaping circuit 6c.

In the operation of this prior art flowmeter, when Karman's vortex streets or paths are generated in the vicinities of the opposite sides of the vortex generator 2 installed in position within the pipe line 1, pressures resulting from the vortices are transmitted through the openings 3, 41 or 42 to the vibrating plate 44 thus to displace it. These vortices occur alternately in the vicinities of the opposite sides of the vortex generator 2 and cause the plate 44 to vibrate. Light from the light emitting device 6a in the signal processing circuit 6 is introduced into the vibrating plate 44 through optical fiber 5a and reflected at the surface of the vibrating plate, and then it is transmitted to the light receiving device 6b through optical fiber 5b. Since the edge surfaces of the optical fibers 5a and 5b are opposed substantially vertically to the vibrating surface of the plate 44 in this construction, the quantity of light entering the light emitting device 6b varies in response to the displacement of the vibrating plate 44. As such, the light receiving device 6b receives a signal corresponding to one reciprocation of the vibrating plate 44, thus permitting detection of the vibration frequency of the vortices.

Generally, flowmeters of this kind have the disadvantage that generation of vortices becomes unstable and weak vortices are produced at lower flow velocities, thus rendering accurate measurement difficult.

First, problems of vortex generators will be discussed. FIG. 3 schematically shows one example of a prior art flowmeter, in which two pillars $K_1$ and $K_2$ are disposed at a space along the flow. Pillar $K_1$ on the upstream side for producing vortices is triangular in shape, while pillar $K_2$ on the downstream side is shaped like a plate. This triangular pillar forms a contour resembling a streamline relative to the flow, and therefore the pillar is advantageous in that it does not incur a great pressure loss. However, it cannot produce vortices with ease, and particularly when the flow velocity is low, measurement is difficult. Also, in such a construction, detection of vortices is carried out on the downstream side of the pillars and, accordingly, if pulses or the like occur in the pipe line, variation in flow velocity or pressure produces noise, thereby making accurate detection of vortices impossible.

Also, another flowmeter is known in which a pillar having a substantially isosceles trapezoidal cross section is so disposed that the base is vertical to the direction of flow in order to produce vortices over a relatively wide range of quantity or velocity of flow. Unfortunately, it is disadvantageous in that a large pressure loss results, because the surface against which the flow collides is flat. Yet another prior art vortex generator has a plurality of pillars which are disposed at regular intervals along the flow for producing vortices. This is, however, disadvantageous in that it is complex in construction and expensive to fabricate.

Next, problems of vortex detectors will be discussed. Generally, in a flowmeter of this kind, Karman's vortex paths or streets occurring on the downstream side of a pillar or pillars are very weak when the velocity of flow is low. Hence, a highly sensitive detector is required. Means using a highly sensitive heated wire or ultrasonic wave have the disadvantage that they electrically amplify minute analog signals and so the temperature characteristics and stability of the detector or detecting circuit considerably affect the measuring accuracy and range. Accordingly, detectors used for detection of vortices when flow rate is low must be relatively unaffected by these factors, and furthermore they must be highly sensitive.

In these prior art apparatuses, an example of apparatus in which a vibrating plate is displaced by vortex pressure to facilitate signal processings is disclosed in Japanese Utility Model Laid-Open No. 21501/1971, where a vibration chamber is provided within a vortex generator and a vibrator consisting of a plate body installed on the wall of the chamber, one end of the vibrator being fixed. The velocity or quantity of flow is derived from the vibration frequency of the vibrator. This apparatus is advantageous in that it is simple in construction, because pressure change resulting from the occurrence of vortices is directly detected as displacement or force. However, as the vibrator generates bending vibrations with its one end fixed, it frequently malfunctions due to external vibrations. Particularly when flow velocity is low, pressure change resulting from occurrence of vortices is quite small and so it is impossible to discriminate vibrations due to vortices from external vibrations, thereby making accurate detection of vortex frequency unfeasible.

In conventional vortex detectors, a relatively sensitive vortex detector has a vibrating member which consists of a plate member of light resin and is held so that it can rotate about a revolving shaft. This vortex detector is disadvantageous in that when flow velocity is high and vortex pressure is also high, excessively large displacement or force is applied, because the plate member is displaced in proportion to vortex pressure. As a result, it will be impossible to detect vortices with accuracy, or the detector may be damaged. An example of an apparatus in which a plate member is bent to detect the distortion is disclosed in Japanese Patent Laid-Open No. 36933/1980. This apparatus is able to detect vortices stably even when flow velocity is high, but it cannot detect vortices when flow velocity is low, because it makes use of bending or flexural vibration of the plate member.

Some problems of circuits for processing detected signals will now be discussed. DC component $E_o$ (FIG. 26 described later) corresponding to a given quantity of light which is obtained when a vibrating plate is at rest and at a position of equilibrium is added to AC component "a" which is proportional to the change in light quantity caused by vibration of the vibrating plate. The resultant composite signal is detected by light receiving device 62 (FIG. 2). Conventionally, in order to shape the waveform of such a signal into a desired form, a method has been proposed in which a signal is simply amplified in an alternating manner. In this case, the frequency of vortices varies widely from 10 $H_z$ to 1 $KH_z$. Generally, it is also disadvantageous in that such circuits have a complex configuration. Further, a means in which the output signal from a vortex detector is compared with a given set value is also suggested to shape the waveform into a desired form. As the light quantity is varied because of contamination of optics, for instance, DC components of the aforementioned output signal is also varied, but said given set value is unable to follow this change. Hence, it is usually impossible to detect the vortex frequency.

Karman vortex flowmeters are also useful for measurement of the quantity of air inhaled by an internal combustion engine of an automobile or the like. However, conventional Karman vortex flowmeters have disadvantages as follows. In nearly all engines of recent automobiles, oil vapor or leak gas (which is also called "blow-by" gas) produced within the crank case is returned to the inlet passage through an air cleaner or the like for preventing air pollution. As such, if a flowmeter is placed in the inlet passage, the optics are contaminated after a long term of usage, resulting in decrease in the detection sensitivity.

A flowmeter used in the engine of an automobile or the like is usually in such a position that it is readily affected by temperature or electrical noise within the engine compartment. In the past, as disclosed in Japanese Utility Model Laid-Open No. 28998/1980, an attempt has been made at cooling the electric circuit for detecting vortices in a flowmeter with inhaled air to eliminate the effects of temperature. However, when less air is inhaled as during idle running, the cooling effect is reduced and the temperature rise becomes great, thereby reducing the reliability of the electric circuit. Further, means to compensate for the temperature rise become more costly. In contrast with this, a means in which only the electric circuit for detection of vortices is installed at a different location, for example passenger compartment, which location is superior to the engine compartment in conditions, such as temperature, may be suggested. However, in the course of transmission of a detected feeble electrical signal to the aforesaid electric circuit, the signal is more affected by electrical noise resulting from ignition, thus making measurement impossible.

In a flowmeter as disclosed in the above-cited Japanese Utility Model Laid-Open No. 28998/1980, a processing circuit for processing a detected signal is housed in a bypass passage to cool the circuit with air flowing through the bypass passage. In actuality, when less air is inhaled, the signal processing circuit can be hotter, since at that time a minute quantity of air flows through the bypass passage, because it has a greater resistance than the pipe line, thus reducing the a cooling effect.

SUMMARY OF THE INVENTION

It is an object of the present invention to provide a Karman vortex flowmeter equipped with a vortex generator which can generate relatively strong and regular vortices even when flow velocity is low, produces a relatively small pressure loss and is less affected by disturbance in fluid. This object is accomplished in a Karman vortex flowmeter according to applicants' invention wherein an upstream and a downstream pillar are provided for producing vortex paths, the upstream pillar having a substantially isosceles triangle cross-section and the downstream pillar having a substantially isosceles trapezoidal cross-section, wherein the base of the upstream pillar is substantially equal to the base of the downstream pillar in cross-section, and wherein the pillars are disposed so that their bases are parallel to each other at a given space and perpendicular to the direction of the flow.

It is another object of the present invention to provide a Karman vortex flowmeter equipped with a detector means which is unaffected by external vibrations even at lower flow velocities and is able to precisely detect only vibrations resulting from vortices. This object is accomplished in a Karman vortex flowmeter according to another form of applicants' invention wherein a vibrator member is provided which vibrates in response to pressure variations alternately occurring in the vicinities of opposite sides at a vortex path generator, and wherein the member is supported in a vibration chamber in mass equilibrium relative to a revolving shaft passing through the center of gravity of the vibrator member, so that the member can torsionally vibrate about the shaft.

It is a further object of the present invention to provide a Karman vortex flowmeter capable of detecting vortices stably over a wide range of flow velocity. This object is accomplished in a Karman vortex flowmeter according to another form of applicants' invention wherein a vibrator member is provided which is subjected to pressure variations alternately occurring in the vicinities of opposite sides of a vortex path generator, wherein the fundamental frequency of the natural frequencies of the vibrator member is substantially equal to the lowest frequency of the vortex path to be detected.

It is an even further object of the present invention to provide a Karman vortex flowmeter which can detect vortices with certainty even when a transient phenomenon takes place. This object is accomplished in a Karman vortex flowmeter according to another form of applicants' invention wherein a damped vibrator member is provided which vibrates in response to pressure variations alternately occurring in the vicinities of opposite sides of a vortex path generator.

It is a still further object of the present invention to provide a signal processing circuit which is unaffected by change in light quantity resulting from the variations of light receiving devices and is capable of detecting vortex signals with certainty. This object is accomplished in a Karman vortex flowmeter according to another form of applicants' invention which comprises a vibrator means which vibrates in response to pressure variations alternately occurring in the vicinities of opposite sides of a vortex path generator, a detector means for photoelectrically detecting the vibration of said vibrator means, an integrator for integrating the detector means output, and a comparison means for comparing the integrator output with the detector means output to derive only effective frequency components.

It is a yet further object of the present invention to provide a Karman vortex flowmeter which is used for measurement of the quantity of air inhaled by an internal combustion engine of an automobile or the like and is capable of preventing the contamination of the optics in a simple manner. This object is accomplished in a Karman vortex flowmeter according to another form of applicants' invention, comprising a pillared member disposed in a path through which intake air to an internal combustion engine passes, said pillared member generating Karman's vortex paths in response to the intake air, and wherein the vibrator member vibrates in response to the generated vortex pressure, a displacement detector means for optically detecting the vibrator means displacement, an air supply means for cleaning air outside the air path and for supplying it as a unit of a given quantity, and an optics housing which houses a vibrator member and the displacement detector means and which is supplied with outside air from said air supply means to prevent contamination of the optics.

It is an additional object of the present invention to provide a Karman vortex flowmeter which is used for measurement of the quantity of air inhaled by an internal combustion engine of an automobile or the like and is less affected by temperature and electrical noise. This object is accomplished in a Karman vortex flowmeter according to another form of applicants' invention, comprising a pillared vortex generator disposed in an air inlet passage through which intake air to an internal combustion engine passes, said pillared member generating Karman's vortex paths in response to the intake air, a vibrator member outside the passage which vibrates in response to the produced vortex pressure, a displacement detecting optical means disposed outside the passage for optically detecting the vibrator means displacement, a flowmeter body which includes the vortex generator, vibrator member and optical means, and which is disposed relatively close to the engine, and an electric circuit means disposed relatively far from the engine which converts the light signal from the flowmeter body into an electrical signal for detecting the quantity of intake air, said circuit means being coupled to the flowmeter body by a light receiving fiber of the optical means.

It is another object of the present invention to provide a Karman vortex flowmeter which is used for measurement of the quantity of air inhaled by an internal combustion engine of an automobile or the like and has a sufficient cooling effect even when less air is inhaled and the air may become hot. This object is accomplished in a Karman vortex flowmeter according to another form of applicants' invention, comprising a signal processing circuit for processing a detected vortex signal, a box housing the processing circuit, wherein one side of the box is in communication with an air inlet passage on the downstream side of a throttle valve through a pipe, and wherein the other side of the box communicates with the atmosphere, and wherein air is introduced into the box due to negative suction pressure on the downstream side of the throttle valve to cool the signal processing circuit.

These and other objects and features of the present invention will become more apparent in the course of the following detailed description of the preferred embodiments of the invention taken in connection with the accompanying drawings.

DETAILED DESCRIPTION OF THE PREFERRED EMBODIMENTS

First, an example of Karman vortex flowmeter according to one form of the invention is described with reference to FIGS. 4–10. More specifically, FIG. 4 is a cross sectional view of a vortex generator, and FIGS. 5–10 illustrate the characteristics of the flowmeter.

Figure 1:
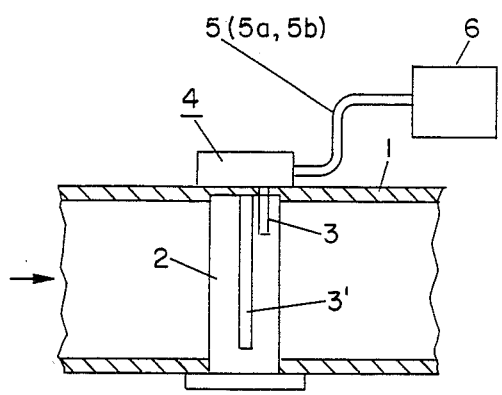
FIG. 1 is a view illustrating the construction of a conventional Karman vortex flowmeter.
Figure 2:
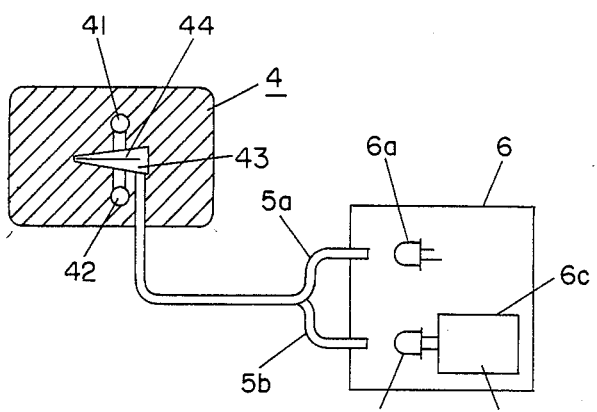
FIG. 2 is a view illustrating the construction of the vortex detecting apparatus of the flowmeter shown in FIG. 1.
Figure 3:
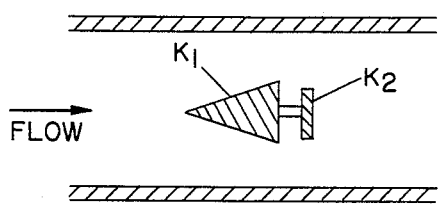
FIG. 3 is a transverse cross section of a known vortex generator.
Figure 4:
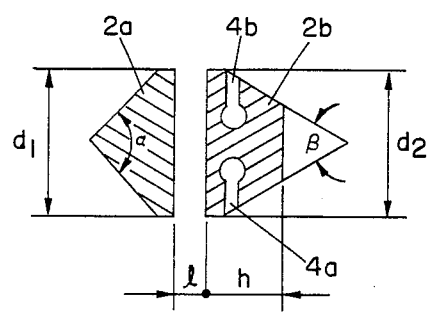
FIG. 4 is a transverse cross section of a vortex generator according to the present invention.
Figure 5:
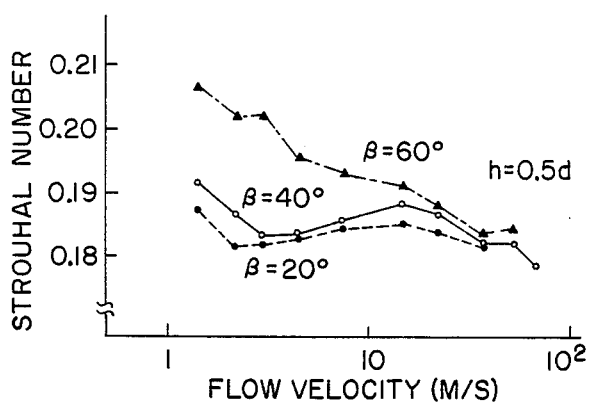
FIGS. 5-10 are graphs showing the characteristics of the vortex generator shown in FIG. 4.
Figure 6:
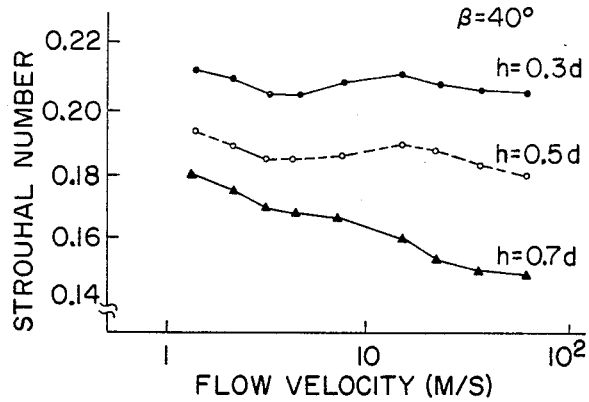

Referring to FIG. 4, there are shown an upstream pillar 2a having a substantially isosceles triangular cross section and a downstream pillar 2b having a substantially isosceles trapezoidal cross section. These pillars are so disposed that the base of the triangular cross section of the upstream pillar 2a and the base of the trapezoidal cross section of the downstream pillar 2b are parallel to each other at a given space of "1" along the flow and that the bases are perpendicular to flow. Further, the projected lengths of the upstream pillar 2a and the downstream pillar 2b at right angles to the direction of flow, that is, representative lengths $d_1$ and $d_2$, respectively, are equal. In FIG. 4, the triangular cross section has a vertical angle of $\alpha$, and the trapezoidal cross section has a height of "h". The equal sides of the trapezoid form an angle of $\beta$. These values are appropriately determined as described later. The downstream pillar 2b is provided with openings 4a and 4b for introducing the produced vortex pressures on opposite sides thereof near the axial edges.

Figure 7:
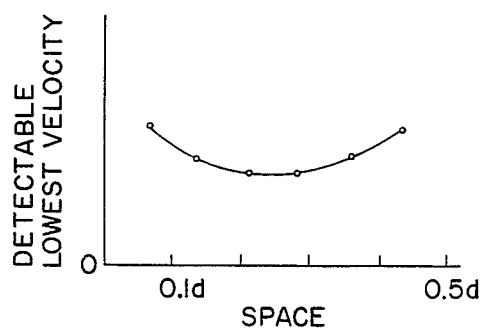
Figure 8:
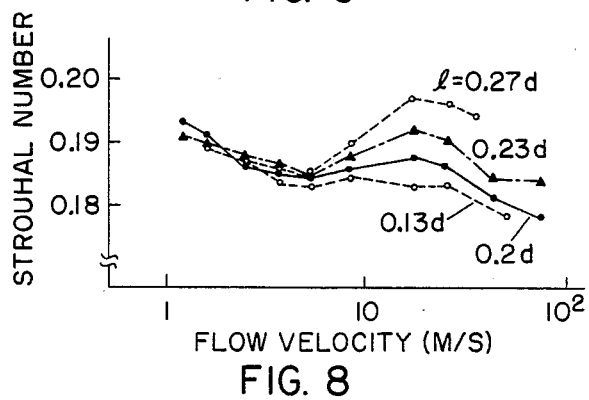

The results of experiments on the effects of vertical angle $\alpha$ of the isosceles triangular cross section of the upstream pillar, angle $\beta$ formed by the equal sides and height h of the isosceles trapezoidal cross section of the downstream pillar, space 1 between the pillars and representative lengths $d_1$ and $d_2$ of the pillars upon the generation of vortices and its stability have revealed several respects as follows. (1) When the representative length of the upstream pillar is substantially equal to the representative length of the downstream pillar ($d_1=d_2\equiv d$), vortices are generated most stably and they can be detected with a good S/N (i.e. signal-to-noise ratio). (2) When vertical angle $\alpha$ of the isosceles triangle of the upper pillar is defined by $$90° \leq \alpha \leq 120°$$

the pressure loss is small and detected vortex waveforms are stable. When the vertical angle is less than the above-defined range, noise having frequency components lower than the vortex frequency is produced. Similarly, when the vertical angle exceeds the range, noise is generated and a great pressure loss occurs. (3) When height h of the isosceles trapezoid of the downstream pillar has the relation: $h \leq d/2$, and angle $\beta$ formed by the equal sides of the trapezoid has the relation: $\beta \leq 40°$, it is possible to detect vortices even at lower flow velocities with a good linearity. Specifically, as may be understood from the results of experiments shown in FIGS. 5 and 6, when $\beta \leq 40°$ and $h \leq 0.5d$, the Strouhal number ( = vortex frequency x representative length/flow velocity) is substantially constant (less than ±3%) and this offers a practical characteristic. (4) When space 1 between the pillars is selected so that it has a value between 0.2d and 0.3d, a wide measuring range and a good linearity are obtained. It will be seen that when the space is within the range, the velocity at which vortices can be detected can be lowered most, as shown in FIG. 7, and linearity at high flow velocities is improved, as shown in FIG. 8.

Figure 9:
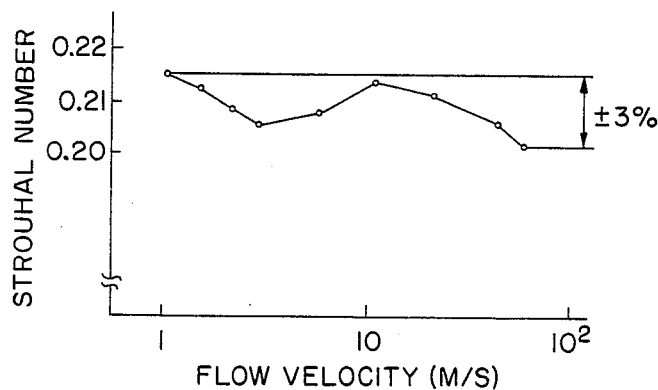
Figure 10:
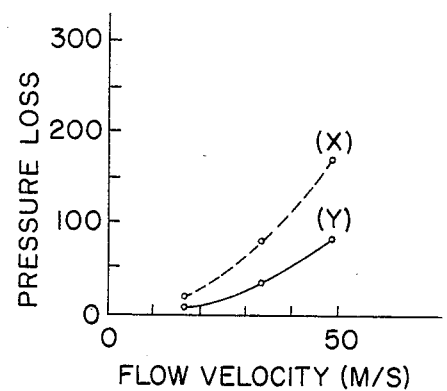

FIGS. 9 and 10 illustrate one example of a characteristic of a flowmeter designed based on the above results. In this example, the upstream isosceles triangle has $\alpha=90°$, the downstream trapezoid has $h=d/3$ and $\beta=40°$. Note that the measurement was carried out on the air of atmospheric pressure. FIG. 9 shows that linearity is kept less than ±3% over a wide range from 1 to 60 m/sec or more of flow velocity, thus offering a practical characteristic. Curve X of FIG. 10 indicates the pressure loss characteristic of a prior art flowmeter in which the downstream pillar has an isosceles trapezoidal cross section and the representative lengths of the pillars are equal to each other, while curve Y of FIG. 10 indicates the pressure loss characteristic of a flowmeter according to the present invention. It will be understood that the device according to the present invention has succeeded in roughly halving the pressure loss.

As described hereinbefore, in accordance with applicants invention which differs from the prior art apparatus in that a pillar for generating vortices is formed into a simple isosceles trapezoid in cross section and from the known apparatus in which an isosceles triangular pillar and a plate are disposed at a given space, the upstream pillar of isosceles cross section and the downstream pillar of isosceles trapezoidal cross section have the same projected lengths in the flow direction and are arranged as a whole in the form of a pentagon, though they are at a given space, and that optimal numerical ranges and relations are determined based on the results of experiments, whereby the pressure loss is small and the characteristic superior in linearity can be obtained over a wide measuring range. Further, differing from the conventional apparatus in which sensors for detecting vortices are disposed on the downstream side of a pair of pillars, the opposite sides of the downstream pillar confronting the flow are provided with openings for introducing pressure changes of vortices and detection of pressure difference is carried out through these openings. As a result, the novel flowmeter can detect vortices with a good S/N over a wide range of flow velocity without being affected by pressure variation caused by pulsation of flow.

Figure 11:
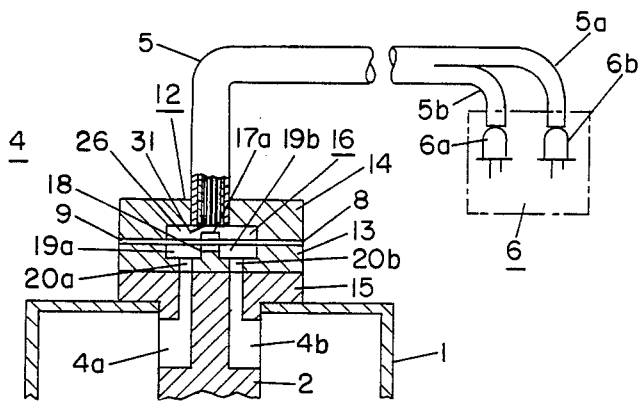
FIG. 11 is an enlarged cross sectional view of a vortex detector taken along the flow of fluid.
Figure 14A:
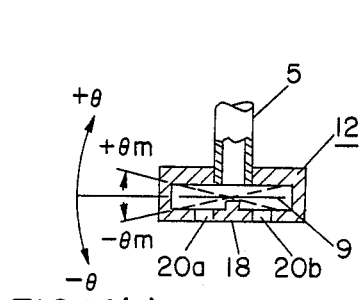
FIG. 14(a) is a view showing the construction of a sensor for detecting the displacement of the vibrator.
Figure 14B:
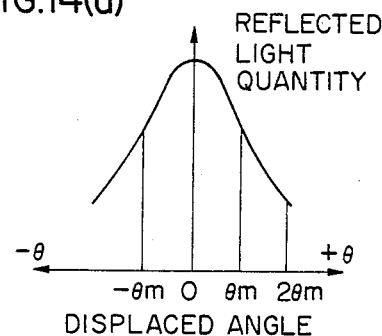
FIG. 14(b) is a graph showing the reflected light characteristics of the sensor in FIG. 14(a)
Figure 12:
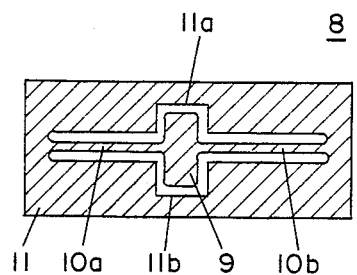
FIG. 12 is a plan view of a vibrator.
Figure 13:
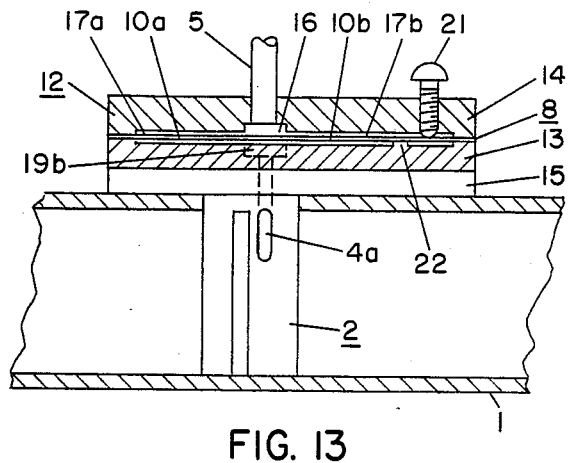
FIG. 13 is a sectional side elevation view of the vortex detector.
Figure 15:
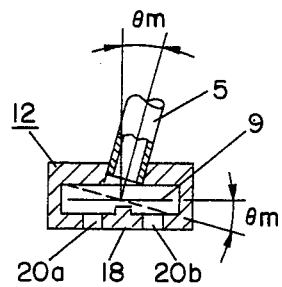
FIG. 15 is a view illustrating the construction of another example of displacement detecting sensor.

Next, an example of a Karman vortex flowmeter according to another form of the invention is described with reference to FIGS. 11–15. FIG. 11 is an enlarged cross sectional view of a vortex detector when taken along the flow. FIG. 12 is a plan view of a vibrator. FIG. 13 is a transverse sectional view of the vortex detector. FIG. 14 shows a displacement detecting sensor for detecting the displacement of the vibrator as well as the characteristic. FIG. 15 shows the construction of another example of displacement detecting sensor.

Referring to FIG. 11, there is shown a pipe line 1, a vortex generator 2 for generating Karman's vortices and a vortex detector 4. The vortex generator 2 is constructed in a manner as described in connection with FIG. 4, for example, and is provided with slits 4a and 4b on the opposite sides of downstream pillar 2b near the axial ends for introducing changes in vortex pressure. In FIG. 12, a vibrator 8 consists of a thin (about 20μ) metal plate, and it includes a relatively wide central vibrating plate 9 on which vortex pressure acts, a pair of relatively narrow taut bands 10a and 10b which support the plate 9 linearly symmetrically relative to a shaft passing through the center of gravity of the plate to allow torsional vibration of the plate, and a frame 11 defining the fixed end of the bands. These components are formed out of one metal plate having a substantially uniform thickness. The vibrating plate 9 is in a state of mass equilibrium relative to the center axis. The taut bands 10a and 10b are designed so that the torsion spring constant defined by the dimensions of the bands is extremely low to allow a sufficient angular displacement of the vibrating plate 9 even when change in vortex pressure is minute, and so that the resonance frequency is as low as possible. Spaces 11a and 11b are formed by stamping-out to form a pair of oppositely disposed end channels for the bands 10a, 10b and a relatively wide central aperture for the vibrating plate 9. In FIG. 11, a housing 12 which houses the vibrator 8 consists of a lower plate 13 and an upper plate 14. The plates 13 and 14 are provided with grooves which are substantially the same in shape and disposed in opposition to each other. The shape of the groove corresponds to the shape of the vibrator 8. By heaping the lower plate 13, vibrator 8 and the upper plate 14 on flange 15 of the vortex generator 2 in sequence, the vibrator 8 is supported and, at the same time, a vibration chamber 16 and chambers 17a and 17b for housing the taut bands are formed. The vibration chamber 16 is divided substantially equally into an upper partition 26 and a lower partition (19a,19b) by the vibrating plate 9 of the vibrator 8. The lower partition formed by the vibrating plate 9 and the lower plate 13 is further partitioned equally into subchambers 19a and 19b by a protrusion 18 of the lower plate 13 opposite the revolving (i.e., oscillating or twisting) shaft of the vibrating plate 9. The subchambers 19a and 19b are in communication with the slits 4a and 4b of the vortex generator 2 through holes 20a and 20b, respectively. The protrusion 18 acts to prevent circulation of fluid between the subchambers 19a and 19b thus to transmit change in vortex pressure from the slit 4a or 4b to the vibrating plate 9 without loss.

As long as torsional vibration of the vibrating plate 9 is not hindered, the space between the protrusion 18 and the vibrating plate 9 should be as narrow as possible, preferably on the order of 0.1–0.2 mm, for example. For similar reasons, the space between the vibrating plate 9 and the vibration chamber 16 is preferably on the same order. Referring to FIG. 13, there is shown an adjusting screw 21 for applying a tension to the taut bands 10a and 10b, and this screw is disposed on the center axis of the taut band 10b. The screw 21 applies a tension to a portion between the fixed end of the taut band 10b and the protrusion 22 formed with the lower plate 13 for preventing bending vibration of the vibrator 8. As described later in connection with FIGS. 16–17, the taut band is preferably pressed by the screw via a spring member. As shown in FIG. 11, reflecting type optical fibers 5 for detecting the angular displacement of the vibrator 8 have two optical paths 5a and 5b for transmission and reception. The optical axes are in opposition to the upper surface of the vibrating plate 9 of the vibrator 8 in substantially perpendicular relation to the surface, and the optical paths open into the partition 26. That is, the optics are totally included in the partition 26. As a result, the optics are prevented from coming into direct contact with fluid. The other ends of the optical fibers are provided with a light emitting device 6a and a light receiving device 6b, respectively. Indicated by reference numeral 6 is a detector circuit including the light emitting device 6a, the light receiving device 6b and a amplification and waveform shaping circuit (not shown).

In the operation of the apparatus described hereinbefore, when a vortex 30 is generated on the upper side (on the side of the slit 4b) of the vortex generator 2, for example, the pressure near the slit 4b becomes lower than the pressure near the opposite slit 4a. Accordingly, the pressure within the subchamber 19b communicating with the slit 4b becomes lower than the pressure within the subchamber 19a communicating with the opposite slit 4a. Next, balance of forces around the revolving shaft of the vibrating plate 9 is discussed by referring to FIG. 11. Pressure applied on the the upper surface of the vibrating plate 9 is substantially uniform over the whole surface. With respect to the underside of the vibrating plate 9, the pressure within the subchamber 19b is lower than that within the subchamber 19a and, eventually, a clockwise moment corresponding to the pressure difference acts on the vibrating plate 9. Then, the vibrating plate 9 will be rotated in a clockwise direction, but the bottom surface and the upper surface of the vibration chamber 16 limit the amplitude of the rotation. Then, when a vortex generates in the opposite side of the vortex generator, the pressure within the subchamber 19a becomes lower than that within the subchamber 19b, and therefore the vibrating plate 9 is displaced in a counterclockwise direction. The amplitude is similarly limited by the bottom and upper surfaces of the vibration chamber 16. Thus, generation of a pair of vortices causes torsional vibration of one reciprocation of the vibrator 8. As it is limited by the wall surfaces of the vibration chamber 16, the amplitude is substantially kept at constant irrespective of change in vortex pressure. Since the vibrating plate 9 is essentially at balance in mass around the central revolving shaft, inertia forces resulting from external vibrations are cancelled out around the revolving shaft. Hence, no torsional vibration will occur. Further, since tension is always applied to the taut bands 10a and 10b, the vibrator 8 hardly follows vertical external vibrations. The vibrator is free from external vibrations in this respect. Although a tension is applied to the taut bands in this manner, the torsional spring constant is hardly affected thereby. Therefore, the resistance to vibration can be improved without decreasing the sensitivity in detecting vortices.

Thus, generation of vortices causes the vibrator 8 to torsionally vibrate within the vibration chamber 16. To regularize these vibrations over a wide range of vortex frequencies, for example from 10 $H_z$ to 1 $KH_z$, it is important to transmit change in vortex pressure directly to the vibrating plate 9 without loss. For this purpose, the present invention provides the slits 4a and 4b in the vortex generator 2 at the axial ends to introduce changes in vortex pressure into the subchambers 19a and 19b at the shortest distance, and provides the protrusion 18 to minimize leak between the subchambers 19a and 19b. Further, the gap between the periphery of the vibrating plate 9 and the wall surfaces of the vibration chamber 16 is so formed that leakage between the partition 26 and the subchamber 19a or 19b is also minimized. As such, vortex pressure acts on the pressure receiving plate or vibrating plate without loss, thereby allowing stable detection of vortices.

Next, detection of the number of displacements, that is vibration frequency, of the vibrator 8 is described with reference to FIGS. 11, 14 and 15.

The vibration frequency is detected by measuring the change in reflected light quantity at the upper surface of the vibrating plate 9 by the use of the optical fibers 5. Specifically, the optical fibers 5 have two optical paths 5a and 5b, and these paths are arranged in a random manner on the end surface 31 opposite to the vibrating plate 9 but the optical axes are substantially vertical to the surface of the vibrating plate 9. As the quantity of light reflected from the vibrating plate 9 decreases with the rotation of the reflecting surface of the vibrating plate, as shown in FIG. 14 (b), one reciprocation vibration of the vibrator produces two light pulse outputs. Since the displacement of the vibrator 8 is substantially constant, light output will be also substantially constant. Hence, it is possible to detect the vortex frequency by means of a simple circuit configuration. Thus, the method for detecting reflected light is very practical, because it requires only a simple configuration and eliminates the necessity of aligning optical axes. Furthermore, the optics comprising the optical fibers 5 and the reflecting surface are located within the partition 26 of the vibration chamber 16 and so they do not come into direct contact with fluid, and so that contamination of the optics is prevented.

In the aforementioned detecting mechanism, the optical axes of the optical fibers 5 are substantially vertical to the surface of the vibrating plate 9. Alternatively, it is also possible to prebias the optical axes of the fibers 5 from the line normal to the surface of the vibrating 9 by the maximum angular amplitude $\theta_m$ of the vibrating plate 9 in the vibrating surface, as shown in FIG. 15. This configuration is advantageous in that a minute angular displacement can be detected with a good sensitivity and an output signal of substantially sinousoidal waveform is derived to facilitate signal processings as can be seen rom FIG. 14 (b), because a substantially constantly inclined portion of the curve of the figure is used. Of course, the peak of the reflected light quantity is shifted to the right in FIG. 14 (b). It should be noted that the present example is not limited to the optical fiber construction, but rather any construction can be employed as long as it can effectively detect change in the quantity of reflected light.

As described hereinbefore, in accordance with this form of the invention which differs from the conventional apparatus in which a vibrator of the invention adapted to be displaced by vortex pressure is caused to vibrate bendingly with its one end fixed, the novel vibrator is at balance in mass relative to the linearly symmetrical shaft passing through the center of gravity of the vibrator by being supported by the taut bands on the shaft, thus allowing torsional vibrations around it. Further, a tension is applied to the bands to prevent bending vibrations, so that the vibrator is unaffected by external vibrations. Furthermore, it is advantageous in that is has a good resistance to vibrations and is capable of detecting vortices with an improved sensitivity in spite of the fact that the torsional spring constant is small.

Also, a chamber for housing the vibrating plate which is caused to vibrate torsionally by vortex pressure is provided, and this chamber is devided substantially equally into two partitions by the vibrating plate. One of the partitions is further partitioned symmetrically with respect to the revolving shaft of the vibrating plate into two subchambers, which are provided with openings for introducing changes in vortex pressure through their walls to allow the vibrating plate to torsionally vibrate. The amplitide of this vibration is limited by the walls opposite to the vibrating plate, and therefore vibration having a substantially constant amplitude can be obtained independent of vortex pressure. Also, the other partition is provided with a means for detecting the displacement of the vibrating plate, which itself separates the portion that transmits vortex pressure change from the vibration displacement detector. As a result, the detector hardly comes into direct contact with fluid and so it is possible to detect vortices without substantially experiencing the adverse effects of contamination. Further, the displacement detecting means of the vibrating plate comprises two light paths opening into the partition at first ends thereof in opposition to the vibrating plate and the pair of light emitting and receiving devices disposed at the other ends, and torsional vibration of the vibrating plate allows detection of the change in the quantity of light reflected from the vibrating plate. Thus, the novel apparatus is simple in construction and can detect vortices without being affected by electromagnetic noises.

Referring to FIG. 13, the adjusting screw 21 applies a tension to the taut band 10b. If the material of the vibrator 8 differs from the material of housing 12 (that is, lower plate 13 and upper plate 14), then heat will make a great difference between the tensions in the taut bands 10a and 10b because of the difference between their thermal expansivities. Also, even if the material of the vibrating plate 8 is the same as that of the housing 12, when a transient thermal change takes place, there occurs a temperature difference between the vibrator 8 and the housing 12. The result is that tensions in the bands differ greatly, whereby a decrease in the resistance to vibration and damage of the taut bands may occur. These difficulties can be overcome by the coutermeasures as provided by the invention.

Figure 16:
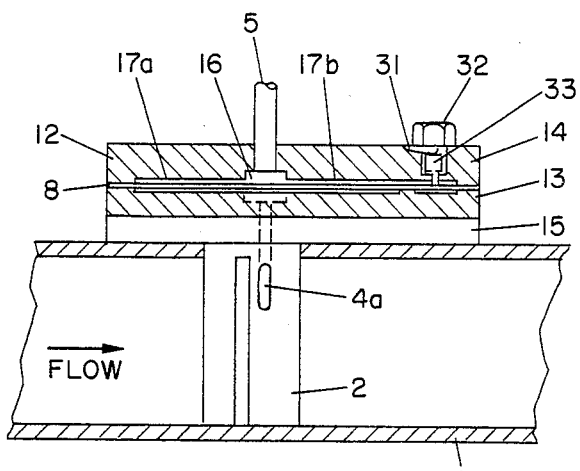
FIG. 16 is a sectional side elevation view of one example in which taut bands are pressed via a spring.

Another example of the invention is now described in detail with reference to FIGS. 16 and 17. FIG. 16 is a transverse cross section of this example, and FIG. 17 is a fragmentary enlarged transverse cross section of this example.

Figure 17:
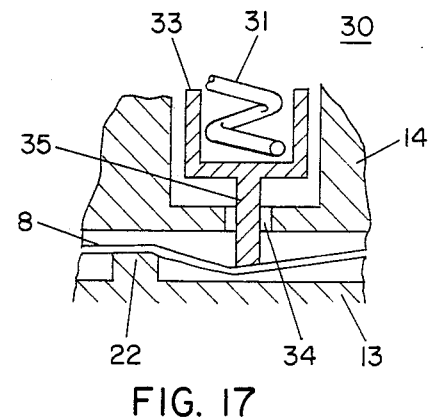
FIG. 17 is an enlarged sectional side elevation view of a main portion of FIG. 16.

Referring to FIGS. 16 and 17, there is shown a tension applying mechanism 30 for applying tension to the taut bands 10a and 10b, a compression spring 31, a cap 32 and a presser 33 for pressing the taut band 10b. The presser consists of a light resin formed into a hollow cylinder having a bottom, which is provided with a rectangular protrusion 35. When the spring is compressed, the protrusion is guided by a rectangular guide hole 34 formed in the upper plate 14 to prevent the presser 33 from rotating, and it applies tension by pressing against the taut band 10b between the peripheral fixed portion of the taut band 10b and a protrusion 22 formed on the lower plate 13, thus preventing bending vibration in the upper vibrator 8. The spring 31 is housed within the envelope of the presser 33, and the cap 32 prevents it from escaping therefrom.

When a rapid temperature change occurs, a temperature difference arises transiently between the vibrator 8 and the housing 12 (that is, upper plate 14 and lower plate 13). Therefore, due to the difference between their thermal expansions the lengths of the taut bands may be different from each other even if they consist of the same material. However, in accordance with the present invention, the compression spring 31 which has a small spring constant applies a tension to the taut bands so that the bands are usually bent as described previously, and therefore the bands can absorb variation of length resulting from thermal expansion. Also, as the tensions are substantially kept at constant, damage of the taut bands and a decrease in the vibration-resistance which would otherwise be caused by external vibrations are prevented.

As described hereinbefore, in accordance with the invention, the taut bands of the vibrator are pressed by the spring, the tensions in the bands are unaffected by temperature change and always remain unchanged. Consequently, a decrease in the vibration-resistance attributable to temperature change and damage of the taut bands are prevented.

Figure 18:
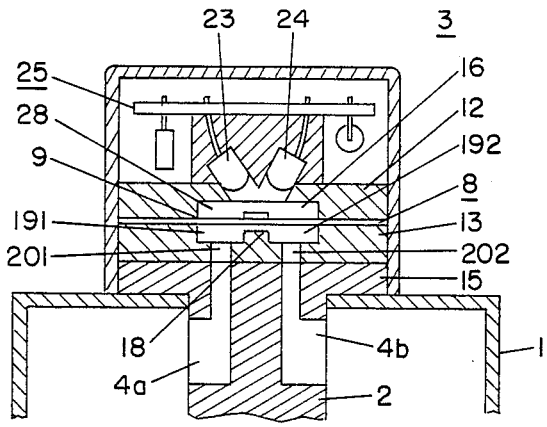
FIG. 18 is an enlarged sectional view of a vortex detector taken along the flow of fluid, the light emitting and receiving devices thereof being illustrated opposed to a plate member.
Figure 19:
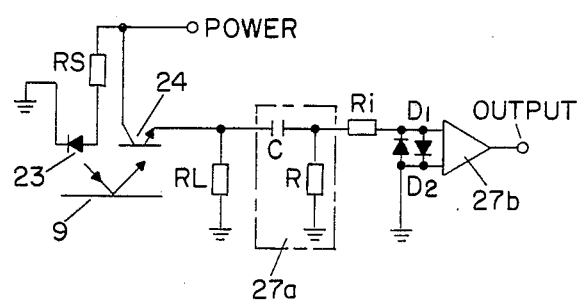
FIG. 19 is a diagram of a circuit for processing detected signals for vortices in FIG. 18.

In FIG. 11, light emitting and receiving devices are connected to first ends of the optical fibers with, the other ends being opposed to the vibration member. However, the light emitting and receiving devices may be opposed to a plate member. This arrangement is described hereinafter with reference to FIGS. 18–21. FIG. 18 is an enlarged cross section of a vortex detector taken along the flow of fluid, FIG. 19 is a diagram of a circuit for processing a detected vortex signal, FIG. 20 is a view illustrating the construction of a displacement detecting sensor for detecting the displacement of a vibrator as well as the characteristic of the sensor, and FIG. 21 is a view illustrating the construction of another example of displacement detecting sensor.

Referring to FIG. 18, a light emitting device 23 and a light receiving device 24 are disposed so that they are opposed to the upper surface of the vibrating plate 9 and their light axes pass through the central revolving shaft of the vibrating plate 9. A detection circuit 25, which energizes the devices 23 and 24 and processes the output signals, includes a coupling circuit 27a for deriving only AC components from the output signal from the light receiving device 24 and comparator 27b for pulsing this signal, as shown in FIG. 19.

Figure 20A:
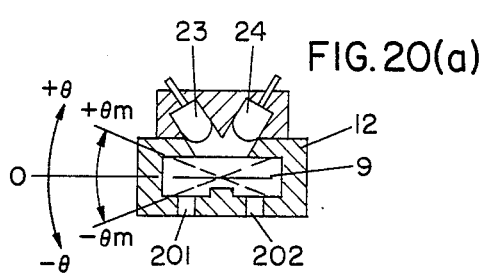
FIG. 20(a) is a view showing the construction of the displacement detecting sensor in FIG. 18.
Figure 21:
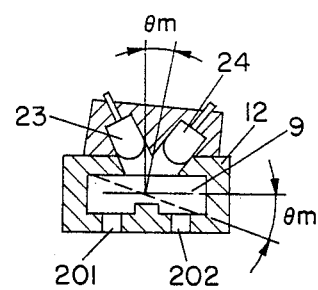
FIG. 21 is a view illustrating another example of displacement detector sensor.
Figure 20B:
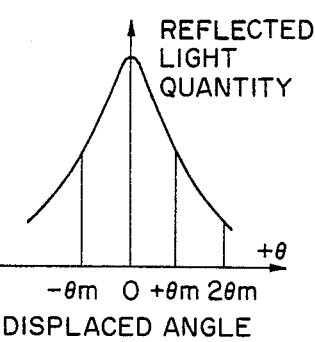
FIG. 20(b) is a graph of the reflected light characteristics of the sensor in FIG. 20(a)

Referring next to FIGS. 18–21, detection of the number of displacements or vibration frequency of the vibrator 8 is described. In this case, detection of the vibration frequency is carried out by detecting the change in the quantity of reflected light at the upper surface of the vibrating plate 9 using the devices 23 and 24. Since the quantity of light reflected from the vibrating plate 9 decreases with the rotation of the reflecting surface of the vibrating plate, as shown in FIG. 20 (b), the output signal from the light receiving device 24 changes twice during vibration of one reciprocation of the vibrator. As the displacement of the vibrator 8 is substantially constant, the light output is also substantially constant, and therefore an output on the order of 1 V can be derived from the device 24 even at lower flow velocities. Consequently, by utilizing only a simple circuit configuration which forms the output into a desired waveform by the comparator 27b the vortex frequency can be detected.

As stated above, the optics comprised of light emitting and receiving devices and the light reflecting surface, are housed within the partition 26 of the vibration chamber 16 and do not come into direct contact with fluid, and hence are free from contamination.

In the foregoing detecting mechanism, devices 23 and 24 are disposed so that the maximum quantity of light is obtained when the vibrating plate 9 lies at a horizontal position. However, as shown in FIG. 21, they may be prebiased by the maximum angular amplitude $\theta_m$ of the vibrating plate 9. This method utilizes the substantially constantly inclined portion of the curve in FIG. 20 (b), and therefore even a minute angular displacement can be detected with a good sensitivity and a low-distortion, substantially sinousoidal output can be obtained, thereby further facilitating signal processing. In this case, one pulse output is obtained during one reciprocation of the vibrating plate.

The construction containing the light emitting and receiving devices is not limited to this example, but rather any means may be used as long as it can detect change in the quantity of reflected light.

As described hereinbefore, in accordance with the invention, the vibrator which is displaced by vortex pressure is advantageous in that is has a good resistance to vibration in spite of its small spring constant and in that it can improve sensitivity in detecting vortices, because the taut bands support the vibrating plate in a state of mass equilibrium, allowing torsional vibration and are tensioned to prevent bending vibration. The means for detecting displacement of the vibrating plate is composed of the pair of light emitting and receiving devices disposed in opposition to the vibrating plate and acts to detect change in the quantity of light refelected from the surface of the vibrating plate due to torsional vibration of the plate. Hence, it is less affected by electromagnetic noises and it produces a large electric output directly, thus vastly simplifying the detecting circuit. Furthermore, it improves stability and reliability with respect to temperature, and it is more economical to fabricate.

Figure 22A:
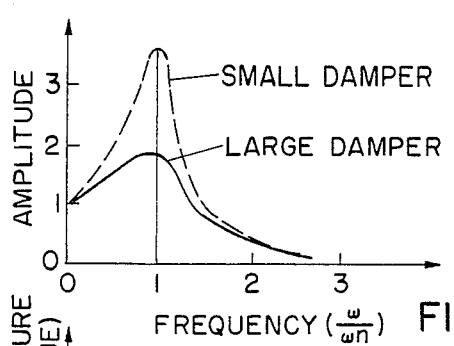
FIG. 22 illustrates the operating characteristics of a vibrator using three graphs, of which graph (a) shows the amplitude response of the vibrator as a function of the angular frequency ratio when subjected to a vibrating force of a given amplitude, graph (b) shows the amplitude of vortex pressure as a function of frequency, and graph (c) shows the amplitude of the vibrator as a function of the angular frequency ratio when subjected to the vortex pressure of graph (b)
Figure 22B:
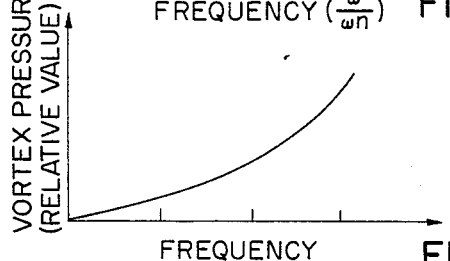
Figure 22C:
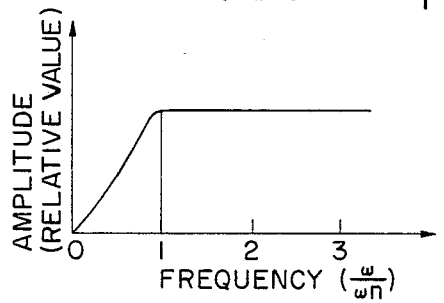

Next, a Karrman vortex flowmeter according to another form of the invention is described with reference to FIG. 22. FIG. 22 illustrates the operating characteristics of such a vibrator. Generally, a vibrator (see FIG. 12, for example) vibrates in response to the frequency of vortices. In this invention, the fundamental vibration frequency of the torsional vibration which is defined by the moment of inertia of the vibrating plate (as indicated by numeral 9 in FIG. 12) and the torsional spring constant of the taut bands (as indicated by numerals 10a and 10b in FIG. 12), is made substantially equal to the lowest frequency of vortices to be measured by appropriately selecting the length and width of the bands and the dimensions of the vibrating plate and so forth.

When a vibrating force of a given amplitude is applied to such a vibration system, the system offers a frequency response shown in FIG. 22 (a) as is well known in the field of vibrational science. It can be said generally that in FIG. 22 (a) the amplitude increases in proportion to angular frequency $\omega$ and reaches the peak at resonance angular frequency $\omega_n$, and then it decreases in inverse proportion to the square of the applied angular frequency, though the chracteristic is affected by the size of the damper. In this figure, the ordinate represents amplitude ratio (dynamic amplitude X/static amplitude $a_{st}$), while the abscissa represents angular frequency ratio which is a dimensionless quantity. On the other hand, it has been found experimentally that the magnitude of change in vortex pressure increases substantially in proportion to the square of the flow velocity, as shown in FIG. 22 (b). Since the vortex frequency is proportional to the flow velocity, the magnitude of change in vortex pressure eventually increases in proportion to the square of the vortex frequency.

In the present invention, the natural angular frequency $\omega_n$ of the vibrator is made equal to the lowest frequency of vortices, and therefore the vibrator will receive a vibrating force which increases in proportion to the square of the frequency. Thus, the amplitude of the vibrating plate of the vibrator is substantially constant, as shown in FIG. 22 (c).

Thus, by lowering the resonance frequency of the vibrator and conforming it to the characteristic of change in vortex pressure in accordance with the principle of the invention, a large displacement can be obtained at lower flow velocities (at lower frequencies) and excessively large displacement is prevented at higher flow velocities (at high frequencies). In order to avoid instability at resonance, the vibration system is preferably damped to an appropriate extent.

As stated above, the frequency response of the vibration system and change in vortex pressure have a complementary relation according to the invention, so that a substantially constant amplitude of displacement can be obtained over the whole range of vortex frequency. Further, the novel means is practical in that the sensitivity at lower flow velocities increases and, at the same time, excessively large displacement is prevented at higher flow velocities, thus insuring stable vibration and preventing damage of the apparatus.

Figure 23A:
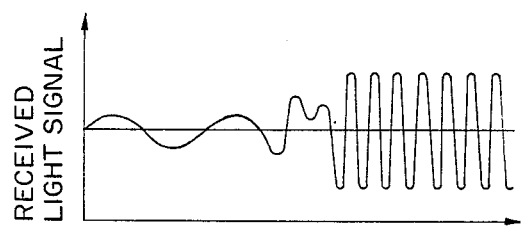
FIG. 23 illustrates the characteristics of the output signal from a flowmeter using three graphs, of which graph (a) shows the received light signal of a vibrating plate having undamped taut bands when subject to a transient flow increase, graph (b) shows the received light signal of a vibrating plate having damped taut bands when subject to a transient flow increase, and graph (c) shows the aforementioned transient flow increase.
Figure 23B:
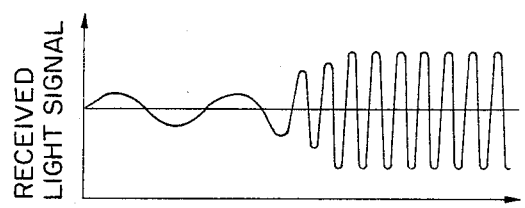
Figure 23C:
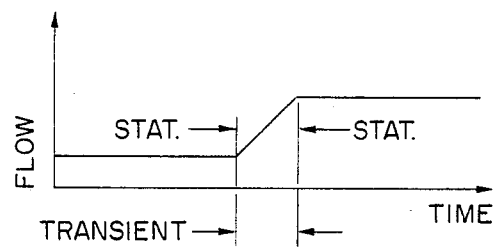
Figures 24A, 24B:
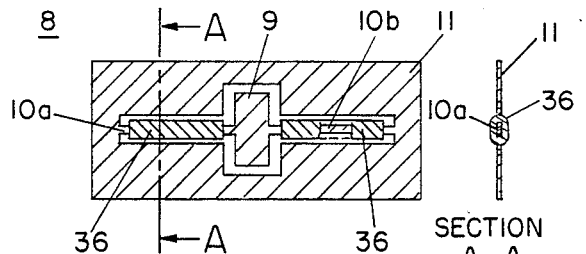
FIGS. 24 and 25 are similar views each schematically illustrating one example of vibrator in which damping material is applied to taut bands.
Figure 25:
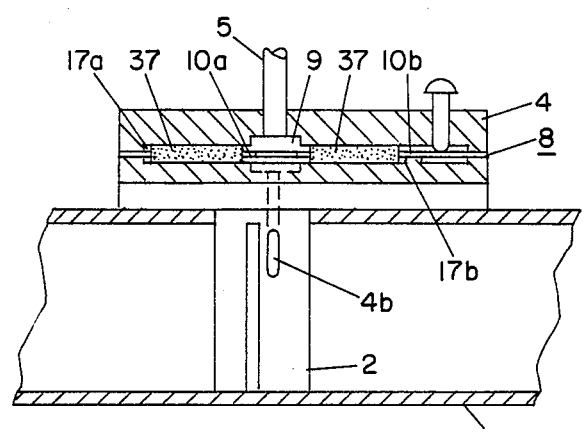

Next, an example of Karman vortex flowmeter according to another form of the invention is described with reference to FIGS. 23-25. FIG. 23 illustrates the output signal characteristic of the flowmeter. FIG. 24 is a schematic representation of one example of a vibrator. FIG. 25 is a schematic representation of another example of a vibrator.

In a stationary state, a signal detected by a light receiving device has a waveform which is symmetrical relative to a constant DC component corresponding to the equilibrium position when the vibrating plate is at rest, as shown in FIG. 23 (a). However, in a transient state where flow increases abruptly, a resonance occurs at a natural frequency defined by the mass of the vibrating plate of the vibrator and the torsional spring constant of the taut bands. For example, if the flow changes transiently as shown in FIG. 23 (c), the waveform is disordered, and hence it is virtually impossible to detect vortices. It is to be noted that a resonance point exists in the frequency characteristic of the torsional vibration of the vibrator, as shown in a broken line in FIG. 22 (a).

Referring to FIG. 24, there are shown vibrating plate 9 and taut bands 10a and 10b. Damping material 36, such as rubbery viscoelastic material, is applied on the taut bands 10a and 10b. Experiment has revealed that the frequency characteristic of torsional vibration of the vibrator having such damped taut bands has no definite resonance point, as shown by a solid line in FIG. 22 (a). As a result, even when a transient change occurs, the vibrator vibrates in full response to change in vortex pressure. Further, as shown in FIG. 23 (B), disorder of waveform is prevented when a transient variation takes place according to the present invention, so that vortices can be detected. Thus, in accordance with the present invention, resonance is prevented in the vibrator 8 at least within the range of vortex frequency.

FIG. 25 is a schematic representation of another example. This alternative example differs from the example shown in FIG. 24 in that chambers 17a and 17b, which are formed in the vortex detector 4 for housing the taut bands 10a and 10b, respectively, are totally filled with damping material 37 rather than having the damping material applied just on the bands 10a and 10b of the vibrator 8. This construction suppresses resonance of torsional vibration of the vibrator and prevents bending vibrations in vertical and horizontal directions, thus eliminating the effects of external vibrations. In this example, the damping material 37 may be silicone rubber, for example.

The damping construction is not limited to this example, but rather a pluraltiy of means may be used in a cooperative manner to prevent resonance of torsional vibration of the vibrator.

Thus, according to this form of the invention, the taut bands supporting the vibrator, which comprises a vibrating member and is caused to vibrate by vortex pressure, are damped, and therefore no interference occurs between the vortex frequency and the resonance frequency of the vibrator even when flow changes abruptly, thus allowing accurate measurement of a transient flow change. This is effective for practical usage. Alternatively, the chambers for housing the taut bans may be totally filled with damping material to provide damping and so that bending vibration of the taut bands is also suppressed. Consequently, effects of external vibrations are further diminished.

Figure 26A:
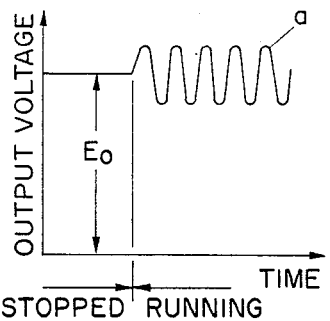
FIG. 26(a) is a waveform of the output voltage of a light receiving device resulting from the detection of vortices.
Figure 26B:
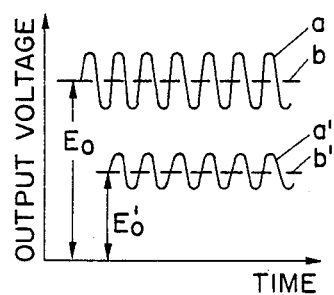
FIG. 26(b) shows similar voltage waveforms associated with the circuits of FIGS. 27 and 28.
Figure 27:
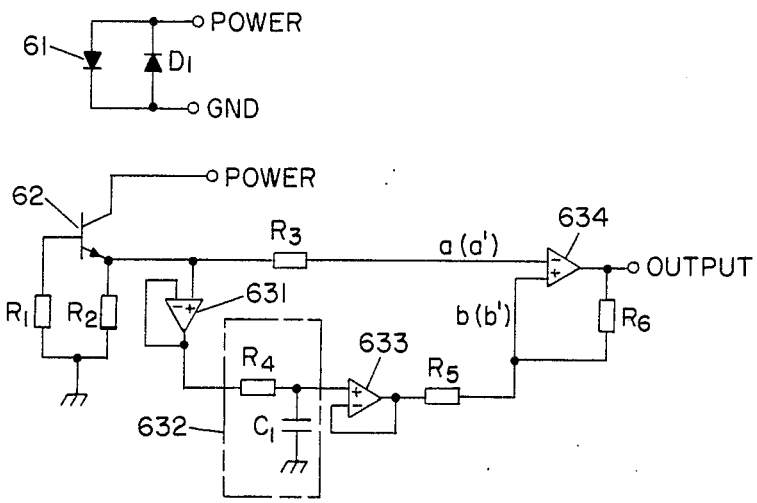
FIGS. 27 and 28 are similar views each illustrating one example of circuit for processing detected signals.
Figure 28:
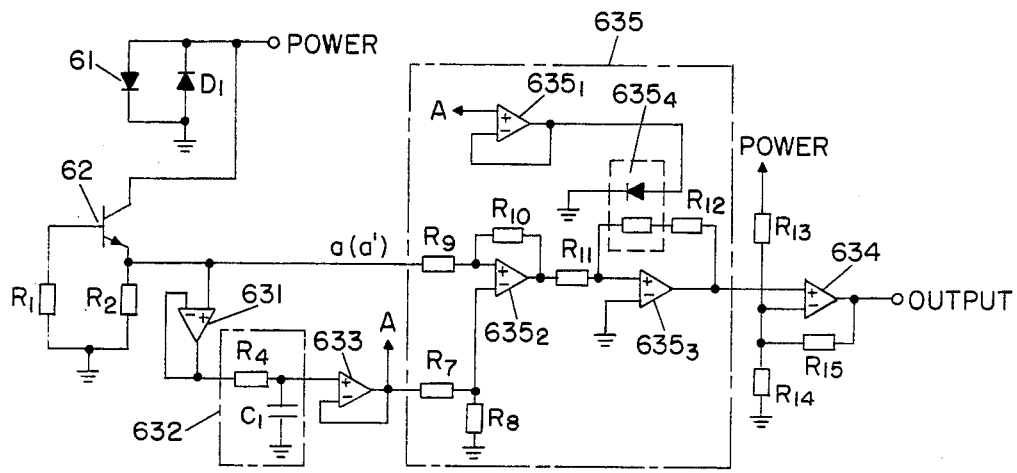

Next, an example of Karman vortex flowmeter according to another form of the invention is described with reference to FIGS. 26–28. FIG. 26 is a waveform chart of detected vortices. FIGS. 27 and 28 are circuit diagrams for processing detected signals and each constitutes one example.

Referring to FIG. 27, there is shown a light emitting device 61, a light receiving device 62, buffer amplifiers 631 and 633, an integrator circuit 632, a comparator circuit 634, resistors $R_1$–$R_6$, a capacitor $C_1$ and a diode $D_1$.

The output signal from the light receiving device 62 is applied directly to the comparator 634. The signal is also applied to the integrator circuit 632 through the buffer amplifier 631, and the signal is applied to the comparator circuit 634 through the buffer amplifier 633 after it is integrated by the integrator 632. The comparator circuit 634 compares these signals, and when they coincide with each other, it produces an output signal. More specifically, the output from the light receiving device 62 has a sinusoidal waveform which is substantially symmetrical relative to DC voltage $E_o$ coresponding to a constant quantity of light obtained at the equilibrium position when the vibrating plate is at rest as indicated by "a" in FIG. 26 (b). On the other hand, the signal derived from the integrator circuit 632 is the same as the DC signal $E_o$, as shown by a broken line b in FIG. 26 (b). Consequently, it is possible to obtain a rectangular wave output responsive to the vortex frequency by comparing these signals and appropriately changing their waveforms in the comparator circuit 634. Since light emitting devices, light receiving devices, optical fibers and so on have generally different characteristics, the DC voltage $E_o$ corresponding to the equilibrium position when the vibrating plate is at rest varies among vortex detecting sensors, and the output signal will change relative to DC voltage $E_o$ as indicated by a' in FIG. 26 (b). However, as aforesaid, this output signal a' is compared with DC voltage b', which has been obtained by rectifying the DC voltage b', and then the waveform is altered, and therefore it is possible to detect the vortex frequency precisely even if the DC voltage $E_o$ varies. Similarly, when DC voltage $E_o$ at the equilibrium position of the vibrating plate drops due to a decrease in light quantity caused by contamination of the optics including the reflecting surface of the vibrating plate and the optical fibers, a rectangular output responsive to the vortex frequency can be derived. It is to be noted that the time constant of the integrator circuit 632 is preferably as large as possible. If the time constant is small, ripples are large at lower vortex frequencies, which renders the difference between the output signal "a" from the light receiving device 62 and the signal b derived from the integrator circuit 632 small, so that the apparatus is more affected by noise. Consequently, it is important that the time constant be higher than the lowest frequency of vortices. Also, it is desirable to give a hysteresis characteristic, as shown in FIG. 27, to the comparator 634 by means of resistances $R_5$ and $R_6$, for example to prevent effects of noise.

FIG. 28 is a circuit diagram of a variation of the example of FIG. 27. Referring to FIG. 28, there is shown an amplifier circuit 635 having a differential amplifier $635_2$ and an amplifier $635_3$. A variable resistor element $635_4$ whose resistance decreases when the applied voltage increases, such as a CdS photocoupler, acts to control the gain of the amplifier $635_3$. Output A from the buffer amplifier 633 is applied to the resistor element $635_4$ through a buffer amplifer $635_1$. This variation differs from the example of FIG. 27 in that the voltage difference between the output signal "a" from the light receiving device and the DC voltage b, which is derived by passing signal "a" through the integrator circuit 632, is amplified and, concurrently, the gain of the amplifier $635_3$ is automatically controlled by the amplitude of the voltage $E_o(A)$ of said DC signal b.

It is now assumed that the light quantity entering the light receiving device 62 has decreased due to contamination of the optics, when the output signal from the device 62 changes from "a" to a', as shown in FIG. 26 (b). Specifically, the DC voltage corresponding to the light quantity obtained at the equilibrium position when the vibrating plate is at rest decreases from $E_o$ to $E_o'$, and the AC voltage corresponding to the change in the light quantity caused by vibration of the vibrating plate also decreases from "a" to a'. However, the differential amplifier $635_2$ can detect the vortex frequency with certainty even when DC voltage $E_o$ varies, because it amplifies either the difference between the output signal "a" from the light receiving device and the DC signal b, which has been derived by rectifying the output signal in the integrator circuit 632, or the difference between a' and b'. Also, if the DC voltage drops, the resistance of the variable resistor element $635_4$ increases, resulting in increase in the gain of the amplifier $635_3$. Hence, a decrease in the AC voltage responsive to the vortex frequency can be compensated for. Accordingly, it is possible to control the gain of the amplifier $635_3$ by appropriately selecting the values of the resistors $R_{11}$ and $R_{12}$ and the resistor element $635_4$. As such, even if the light quantity decreases, it is possible to stably detect the vortex frequency without being affected by the decrease.

It will be understood that the output signal from the light receiving device 62 is applied to the integrator circuit 632 always via the buffer 631 in this example. However, it can be omitted if the impedance defined by the resistance $R_4$ and the capacitor $C_1$ is made sufficiently greater than the load resistance $R_2$ of the light receiving device. Also, in the above example, the displacement of the vibrator is detected by means of the change in the quantity of reflected light, but the transmitted light may be used instead. Further, the construction of the optics and the vibrator are not limited to the above example.

As described hereinbefore, in accordance with the invention, the vibrating member is caused to vibrate by vortex pressure and the displacement is detected by the optical means, and then the resultant output signal is compared with the DC voltage, which has been derived by rectifying said output signal and altering the waveform in the integrator circuit. As a result, even when the DC component of the output signal from the detector varies because of variation of the components of the optics, such as the light emitting and receiving devices, or contamination of the optics, a rectangular output responsive to the vortex frequency is derived. Accordingly, it is advantageous from a practical standpoint in that individual detector sensors can be adjusted with ease and in that it is free from contamination. Further, when the waveform of the output signal from the displacement detecting optical means is altered, the difference between this output signal and the DC signal, which has been obtained by rectifying this signal in the integrator circuit, is amplified and the amplification gain is automatically controlled according to the magnitude of the DC signal, so that a decrease in light quantity attributed to contamination of the optics can be compensated for by the circuit, leading to improvement in reliability.

Examples of Karman vortex flowmeters according to the present invention adapted for measurement of the quantity of air inhaled by the internal combustion engine of an automobile or the like are described hereinafter.

Figure 29:
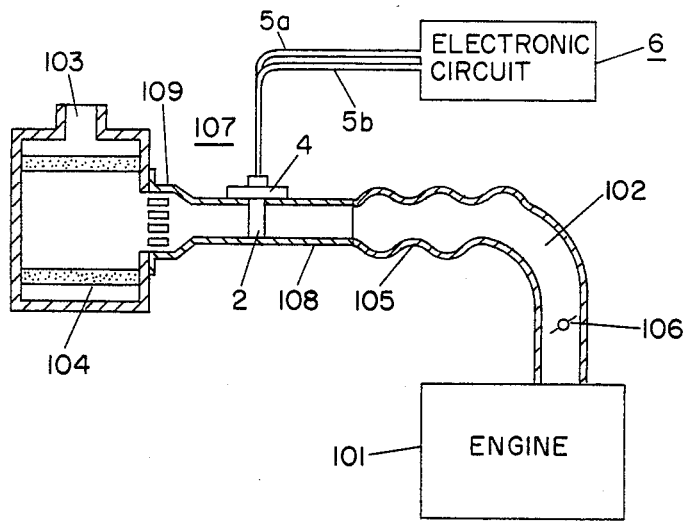
FIG. 29 is a view illustrating the arrangement and constructions of an automobile engine and a vortex flowmeter.
Figure 30:
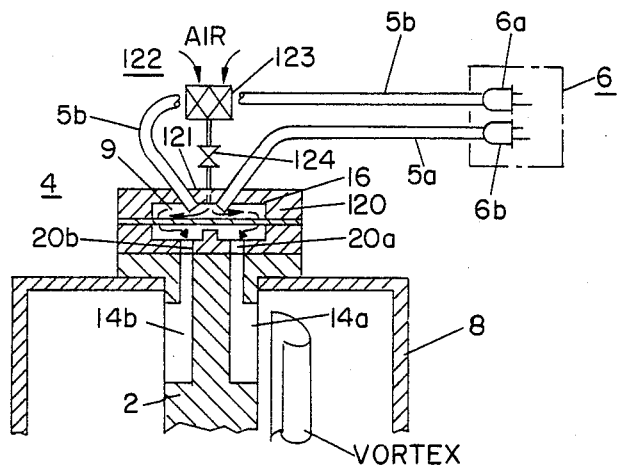
FIG. 30 is a view illustrating a specific example of the flowmeter in FIG. 29.

First, one example of Karman vortex flowmeter is described with reference to FIGS. 29-30. FIG. 29 illustrates the arrangement and constructions of an automobile engine and a vortex flowmeter. FIG. 30 illustrates the construction of an example of flowmeter shown in FIG. 29.

In the figure, an engine 101 and an inlet passage 102 are shown, the passage comprising an air cleaner 103, and filtering element 104, an inlet tube 105, a throttle valve 106 and other elements. A pipe line 108 forms a part of the inlet tube 105, and the flow within the line 108 is stabilized by a flow-rectifying device 109. A Karman vortex flowmeter 107 comprises a vortex generator 2 inserted in the pipe line 108 for generating vortices, a vortex detecting mechanism 4, which converts pressure change of generated vortices into light signal for producing light pulse output responsive to the vortex frequency, and other devices. An electronic circuit 6 for converting the light signal from the vortex detecting mechanism 4 into an electric signal is connected to the vortex detecting mechanism 4 through optical fibers 5a and 5b. As shown in FIG. 30, the vortex detecting mechanism 4 is composed of holes 20a and 20b, chamber 16 communicating with the holes and vibrating plate 9 which vibrates torsionally within the chamber. The holes are in communication with their respective openings 14a and 14b, which are formed in the opposite sides of the generator 2 parallel to the flow, to introduce pressure change of vortices.

First ends of the light fibers 5a and 5b are so disposed that their optical axes collide with the axis of rotation of the vibrator at a certain angle, with the other ends being provided with a light emitting device 6a and a light receiving device 6b for detecting the light reflected from the vibrator. These components are housed in a housing 120. A purging device 122 includes a restrictor 124 and a filter 123, and the chamber is in communication with the atmosphere via the restrictor and the filter and through an opening 121, which is formed in the housing 120 near the light transmitting portion comprised of the vibrator and the optical fibers.

In the operation of the construction described hereinbefore, when air flows through the inlet passage 102 shown in FIG. 29 and a vortex generates on the side of the opening 14a of the vortex generator 2 shown in FIG. 30, the pressure on the side of the opening 14a becomes lower than the pressure on the side of the opening 14b, resulting in a pressure difference between the openings. When one pair of vortices is generated, such pressure differences cause the vibrator 9 to effect torsional vibration of one reciprocation. Change in the quantity of reflected light resulting from the displacement of this vibration is detected by the light receiving device 6b through the optical fibers 5b for measuring the vortex frequency. Further, the quantity of air inhaled is derived from the frequency. The pressure in the chamber 26 is lower than the atmospheric pressure, because on the side of the opening 14a the pressure is obviously lower than the atmospheric pressure and the vortex generator 2 narrows the inlet passage to the opposite opening 14b, thus lowering the pressure on the side of the opening 14b. Accordingly, whenever the automobile is driven and air is inhaled, the pressure in the chamber 26 is negative. In other words, unless the engine experiences a backfire, air is always inhaled by it, and therefore the inside of the pipe line is in a state of negative pressure, which supplies always pure air from the purging device 122 to the light transmitting portion to clean the optics, so that contamination of the optics can be prevented. As the purging air flows into the inlet passage 102 through the holes 20a, 20b and the openings 4a, 4b, the quantity of air will not be measured. However, the restrictor 124 limits the quantity to only less than 0.1% of the quantity of inhaled air. Hence, neither the measuring accuracy nor generation of vortices is affected thereby.

In the example above, the openings for introducing change in vortex pressure are formed on the opposite sides of the vortex generator 10. However, such openings may be formed at any arbitrary location including the vicinities of the generator and location on the downstream side of it, as long as they can detect vortices. That is, as the pressure within the inlet passage 102 is always lower than the atmospheric pressure, air outside the pipe line can be purged. The constructions of the vibrating plate and the optics are not limited to this example. For example, the quantity of transmitted light may be detected, and a light emitting device and a light receiving device may be directly installed without using optical fibers. In brief, any means may be used as long as it optically detects the displacement of the vibrating plate which is caused to vibrate by vortex pressure, and it will have the same advantages as the above example does.

As described hereinbefore, in accordance with this example of the invention, the light transmitting portion for detecting the displacement of the vibrating plate which is caused to vibrate by pressure of Karman's vortices is purged with traces of air utilizing the fact that the areas in the vicinity of a pillar for generating vortices are always in a state of negative pressure. Accordingly, contamination of the optics is prevented. Further, this means is very effective from the viewpoint of practical usage, because it is simple in construction and economical to fabricate.

Figure 31:
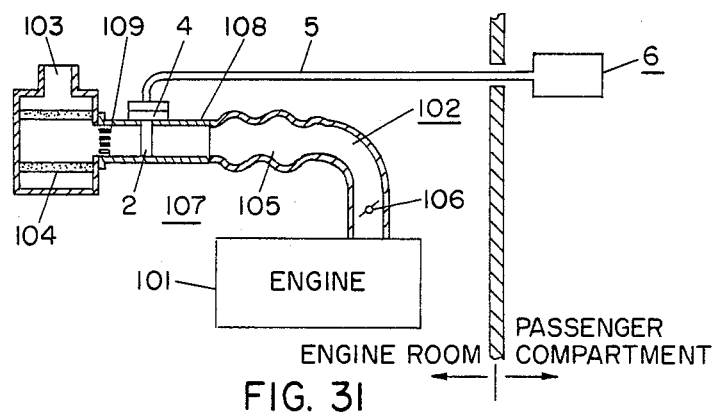
FIG. 31 is a view illustrating the manner in which a flowmeter is installed in an automobile.

An example of Karman vortex flowmeter according to another form of the invention is described hereinafter with reference to FIG. 31, which is a view for illustrating the general arrangement in which a flowmeter is mounted in an automobile. Referring to FIG. 31, there are shown engine 101 and inlet passage 102, which includes air cleaner 103, filtering element 104, inlet tube 105 and throttle valve 106. Vortex flowmeter 107 mounted in the inlet passage 102 is composed of pipe line 108, which forms a part of the inlet tube 105, flow-rectifying device 109 for stabilizing the flow within the pipe line 108 and vortex detecting mechanism 4. This mechanism 4 is mounted in the pipe line and acts to convert pressure change from a vortex into a light signal for producing light pulses responsive to the vortex frequency. These components are all installed in the engine room or compartment. Electric circuit 12 for converting the light signal from the vortex detecting mechanism 4 into an electric signal is installed in the passenger compartment which has a superior environment, that is, it is less affected by temperature, electrical noises, etc. than the engine room (i.e., compartment), and the circuit is connected to the vortex detecting mechanism 4 of the flowmeter 107 mounted within the engine room through optical fibers 5.

In this arrangement, detected signals of vortices are transmitted in the form of light signals to the outside of the engine room through the optical fibers, and accordingly the apparatus is not affected by temperature and electromagnetic noises to any substantial degree.

Although the light emitting device is installed in the engine room, devices of this kind are not readily affected by electromagnetic noises basically. Further, they are energized by direct current and consequently it is sufficient only to stabilize the power supply. Thus, such devices can be relatively easily used.

As described hereinbefore, in accordance with this form of the invention, the vibrating plate displaced by vortex pressure is provided and the displacement is optically detected thus to convert vortex pressure change into a light signal, and then the signal is transmitted to the signal processing circuit installed inside the passenger compartment. As such, compared to the prior art apparatus in which an electric circuit for detecting vortices or processing detected signals for vortices is installed in the engine room and transmits signals electrically, the novel means is capable of arranging almost all electric circuit components outside the engine room, thereby minimizing the effects of increase in surrounding temperature and electromagnetic noises. Furthermore, a passenger compartment experiences less temperature rise than an engine room, thus allowing a simpler electric circuit and decreasing manufacturing cost. Thus, the novel means enjoys practical advantages.

Figure 32:
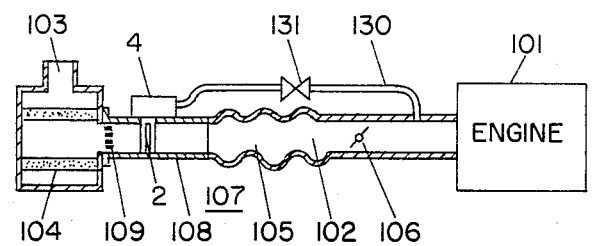
FIG. 32 is a view similar to FIG. 31.
Figure 33:
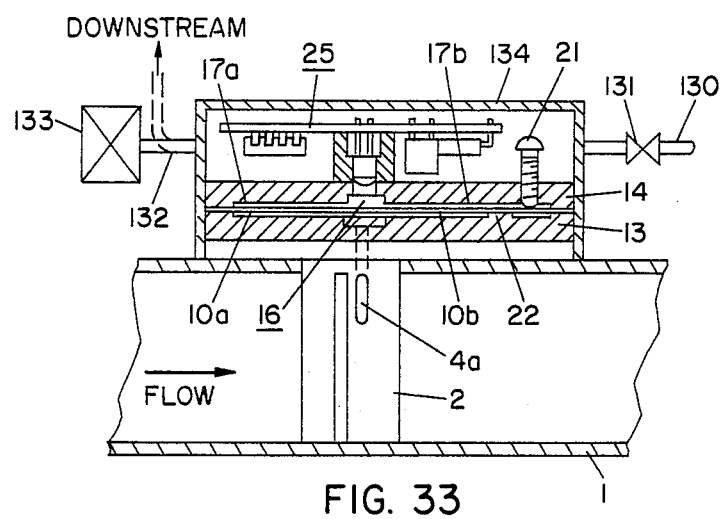
FIG. 33 is a transverse cross section of the flowmeter in FIG. 32.

An example of Karman vortex flowmeter according to another form of the invention is described in detail with reference to FIGS. 32 and 33. FIG. 32 is a view illustrating the general arrangement in which a flowmeter is mounted in an automobile. FIG. 33 is a transverse cross section of the flowmeter in FIG. 32.

Referring to FIG. 32, there are shown engine 101 and inlet passage 102, which is composed of air cleaner 103, filtering element 104, inlet tube 105, throttle valve 106, etc. Vortex flowmeter 107 installed within the inlet passage 102 consists principally of pipe line 108 forming a part of the inlet tube 105, flow-rectifying device 109 for stabilizing the flow within the line 108, vortex generator 2 mounted within the pipe line for generating vortices and vortex detecting mechanism 4. This mechanism converts pressure change of vortices into a light signal and produces a light output responsive to the vortex frequency. Also shown are pipe 130 (described later) and restrictor 131.

In order to introduce air into a box 134 for cooling the components of signal processing circuit 25, this flowmeter is so designed that the pipe 130 for guiding inhaling negative pressure in the engine is connected to the circuit box 134 via the restrictor 131, as shown in FIGS. 32 and 33. An inlet pipe 132 for introducing air into the circuit box opens to the atmosphere via the air filter 133. Thus, a passage of air passing through air filter 133, pipe 132, box 134, pipe 130 and inlet passage 102 is formed due to negative pressure within the engine. Consequently, when temperature within the engine room increases, temperature rise of the circuit elements of the signal processing circuit 25 is prevented, because air is always flowing through the circuit box 134. Particularly when the engine is being idled after a high speed drive, the temperature within the engine room is highest. Also in this case, due to large inhaling or intake negative pressure within the engine, air can flow through the circuit box 134 to cool it sufficiently.

When the throttle valve of the engine is open full, inhaling negative pressure is small and flow of air into the circuit box 134 decreases, but in this case a large quantity of air is flowing through the pipe line, thus the temperature within the circuit box 134 is kept within a reasonable range. Further, flow of inhaled air is less than 0.1% of idling flow, and therefore the accuracy and the like of the flowmeter are not affected by such air.

The opening for introducing air may open into the inlet pipe line. In this case, the air filter 133 is not needed. Particularly when the opening for introducing air is formed on the downstream side of the vortex generator 2 and on the upstream side of the throttle valve 106, as shown by broken lines in FIG. 33, the quantity of air inhaled is measured before it reaches the opening, so that the measuring accuracy is by no means affected by such air.

As described hereinbefore, according to the form of the invention just described, negative pressure on the downstream side of the throttle valve causes air to flow through the circuit box in the Karman vortex flowmeter to cool the signal processing circuit in the box. Hence, even when less air is inhaled and the signal processing circuit would otherwise be hot actually, large inhaling negative pressure on the downstream side of the throttle valve ensures sufficient cooling effect.

While the invention has been particularly shown and described with reference to preferred embodiments thereof, it will be understood by those skilled in the art that various changes and variations may be made without departing from the spirit and scope of the invention.

What is claimed is:

1. In a Karman vortex flowmeter provided with a Karman vortex generator inserted in a path for fluid, a vibration chamber disposed outside said path, two pressure guide inlets for introducing into said vibration chamber the pressure variations alternately produced near the two opposite surfaces of said Karman vortex generator, and a vibrator assembly disposed inside said vibration chamber and adapted to vibrate on exposure to said pressure variations;

the improvement comprising said vibrator assembly in which the vibrator assembly comprises a metal plate of uniform thickness which is shaped to include:

a frame portion which surrounds an elongated aperture having two relatively narrow oppositely disposed end channels and a relatively wide central region, a pair of relatively narrow band portions each of which extends from the frame portion into a different one of the two end channels of the aperture, and a relatively wide vibrator portion supported by said pair of band portions in the wide central region of the aperture and adapted to produce torsional vibration about said pair of band portions, the torsion spring constant being low to permit angular displacement of the vibrator portion even for small changes in vortex pressure;

whereby the flow volume of said fluid is determined based on the number of vibrations of said vibrator portion.

2. In a Karman vortex flowmeter as in claim 1 wherein at least one of said pair of relatively narrow band portions is surrounded with damping material.

3. In a Karman vortex flowmeter as set forth in claim 1 wherein said metal plate divides the vibrator chamber into two partitions of which one includes means for detecting the displacement of the vibrator portion of said plate and of which the other is provided with inlet ports for introducing pressure variations whereby the detecting means and the inlet ports are isolated by the plate.

4. In a Karman vortex flowmeter as set forth in claim 3, the further improvement wherein said means for detecting the displacement of said plate includes a light emitting device and a light receiving device, each having an optical axis arranged in opposition to a surface of said plate, for optically detecting vibrational displacement of the plate.

5. In a Karman vortex flowmeter as set forth in claim 3 wherein said other partition is symmetrically divided into two smaller subchambers with each of the subchambers being in communication with a separate input part so that pressure variations are produced alternately, in the two subchambers.

6. In a Karman vortex flowmeter as in claim 3 the further improvement wherein the detecting means includes a light emitting device, a light receiving device and light transmitting means so disposed to convert the rotational displacement of said vibrator portion of the plate into a change in the quantity of emitted light reflected from the vibrator portion for reception by the receiving means.

7. In a Karman vortex flowmeter as in claim 6 wherein the light transmitting means are disposed to be parallel to the vibration portion of the plate when it is at its maximum rotational position at which further rotation is prevented by the walls of the vibration chamber.

8. A Karman vortex flowmeter for measuring the quantity of air intaked by an internal combustion engine, said flowmeter comprising:
   a signal processing circuit for processing a detected vortex signal;
   a box housing the processing circuit, one side of the box being in communication with an air inlet passage on the downstream side of a throttle valve through a pipe, the other side of the box being in communication with the atmosphere; and
   wherein air is introduced into the box due to negative suction pressure on the downstream side of the throttle valve, whereby the components of said signal processing circuit are cooled.

9. A flowmeter as set forth in claim 8, wherein air for cooling the components of the signal processing circuit is introduced into the box from an inlet pipe line disposed on the downstream side of a vortex generator and on the upstream side of the throttle valve.

10. A flowmeter as set forth in claim 8, wherein the components of the signal processing circuit are installed on a printed circuit board.

11. In a vortex flowmeter comprising a Karman vortex generator inserted in a flow of fluid, a vibrator means adapted to be vibrated on exposure to pressure variations occurring alternately near the opposite lateral surfaces of said Karman vortex generator, and a detector means for photoelectrically detecting the vibration of said vibrator means,
   the improvement comprising an integrator for integrating the output signal from said detector means and a comparator for comparing the output signal from said integrator to the output signal from said detector means to generate a rectangular wave output whose frequency is proportional to the vortex frequency vibrating said vibrator means, wherein said integrator renders said comparator insensitive to variations in the average DC value of the output signal from said detector means.

12. In a Karman vortex flowmeter as set forth in claim 11, wherein the comparator comprises:
   a differential amplifier for amplifying the difference between the output from the integrator and the output signal from the detector;
   a second amplifier for further amplifying the output signal from the differential amplifier; and
   a gain control means for controlling the gain of the second amplifier based on the output signal from the integrator to compensate for any decrease in the output signal from the detector.

13. In a Karman vortex flowmeter in which pillars are placed for deriving the velocity or quantity of flow of a fluid from the frequency of Karman's vortex paths occurring near the pillars,
   the improvement wherein one of said pillars for producing Karman's vortex paths comprises an upstream pillar having a substantially isosceles triangular cross section with its apex facing upstream and the other pillar comprises a downstream pillar having a substantially isosceles trapezoidal cross section,
   the base of the upstream pillar in the cross section being substantially equal to the base of the downstream pillar in the cross section,
   the upstream and downstream pillars being disposed so that said bases are parallel to each other at a given space and perpendicular to the direction of the flow,
   the triangular cross section of said upstream pillar has a vertical angle of about 90°–120°,
   the equal sides of the trapezoidal cross section of said downstream pillar form an angle less than about 40°, and
   the height of the trapezoid is less than about d/2 and the upstream and downstream pillars are spaced about 0.2–0.3d apart when said bases are d in length.

14. In a Karman vortex flowmeter in which pillars are placed for deriving the velocity or quantity of flow of a fluid from the frequency of Karman's vortex paths occurring near the pillars,
   the improvement wherein one of said pillars for producing Karman's vortex paths comprises an upstream pillar having a substantially isosceles triangular cross section with its apex facing upstream and the other pillar comprises a downstream pillar having a substantially isosceles trapezoidal cross section,
   the base of the upstream pillar in the cross section being substantially equal to the base of the downstream pillar in the cross section,
   the upstream and downstream pillars being disposed so that said bases are parallel to each other at a given space and perpendicular to the direction of the flow, and
   the surfaces of the equal sides of the substantially isosceles trapezoid in the cross section of the downstream pillar are each provided with an opening, through which vortex pressure is introduced.

* * * * *